United States Patent
Lin

(10) Patent No.: US 8,710,799 B2
(45) Date of Patent: Apr. 29, 2014

(54) CHARGING SEAT HAVING CLEANING MEMBER

(75) Inventor: Meng-Nan Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 517 days.

(21) Appl. No.: 13/083,604

(22) Filed: Apr. 11, 2011

(65) Prior Publication Data
US 2012/0235643 A1 Sep. 20, 2012

(30) Foreign Application Priority Data
Mar. 18, 2011 (CN) .......................... 2011 1 0065807

(51) Int. Cl.
*H02J 7/00* (2006.01)
(52) U.S. Cl.
USPC .......................... 320/115; 320/107; 320/114
(58) Field of Classification Search
USPC ................................................ 320/107, 115
See application file for complete search history.

(56) References Cited

U.S. PATENT DOCUMENTS

| | | | |
|---|---|---|---|
| 7,023,176 B2 * | 4/2006 | Maebashi et al. | 320/107 |
| 7,332,889 B2 * | 2/2008 | Glasgow et al. | 320/107 |
| 7,456,607 B2 * | 11/2008 | Che et al. | 320/112 |
| RE41,060 E * | 12/2009 | Yu | 320/107 |
| 7,659,696 B2 * | 2/2010 | Zeiler et al. | 320/115 |
| 8,242,744 B2 * | 8/2012 | Matsuoka et al. | 320/115 |
| 2003/0090234 A1 * | 5/2003 | Glasgow et al. | 320/107 |
| 2005/0200329 A1 * | 9/2005 | Aisenbrey | 320/107 |

FOREIGN PATENT DOCUMENTS

| | | |
|---|---|---|
| CN | 201565979 U | 9/2010 |
| JP | 2008-219990 A | 9/2008 |
| TW | 462552 | 11/2001 |
| TW | 200518400 A | 6/2005 |

* cited by examiner

*Primary Examiner* — Drew A Dunn
*Assistant Examiner* — Steve T Chung
(74) *Attorney, Agent, or Firm* — Novak Druce Connolly Bove + Quigg LLP

(57) ABSTRACT

A charging seat includes a base, a cover, a number of conductive contacts, a lid, and a cleaning member. The cover defines an opening and covers the base. The conductive contacts are positioned on the base. The lid is pivotably connected to the cover. The lid is configured to rotate between a first position where the lid closes the opening and covers the conductive contacts, and a second position where the conductive contacts are exposed through the opening. The cleaning member is connected to the lid and is configured to clean the conductive contacts during the rotation of the lid from the first position to the second position.

4 Claims, 5 Drawing Sheets

CHARGING SEAT HAVING CLEANING MEMBER

BACKGROUND

1. Technical Field

The present disclosure relates to charging seats having cleaning members.

2. Description of Related Art

Charging seats are widely used with portable electronic devices. The charging seats typical include two conductive contacts, which are electrically connected with the portable electronic devices when the portable electronic devices are being charged. However, the conductive contacts are easily stained after a longtime of being used. This may reduce bonding of the electrical contact between the charging seat and the portable electronic device.

Therefore, a charging seat which can overcome the limitations described, is needed.

DETAILED DESCRIPTION

Figure 1:
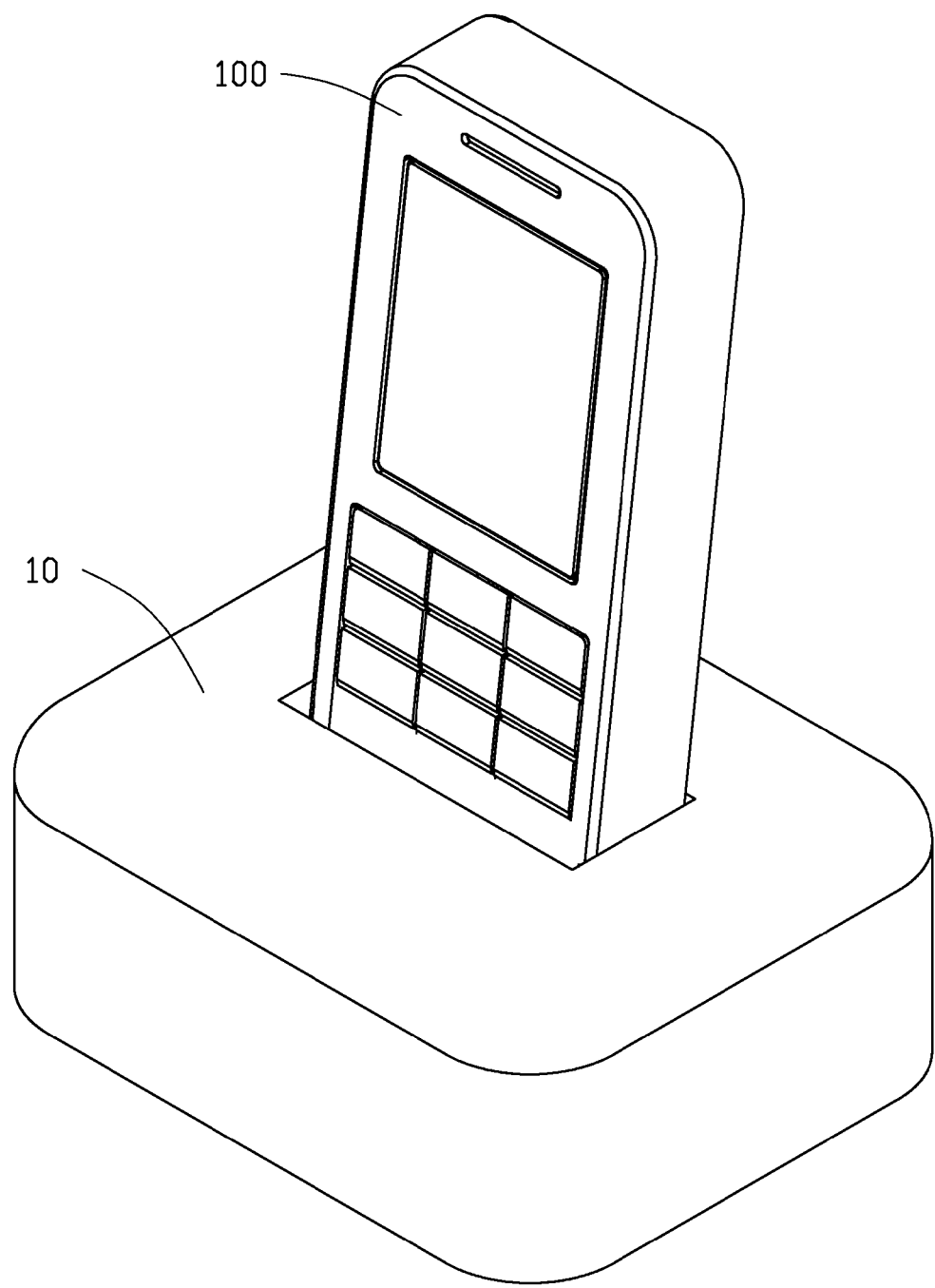
FIG. 1 is a schematic view of a charging seat, according to a first embodiment, showing the charging seat coupled with an electronic device.
Figure 2:
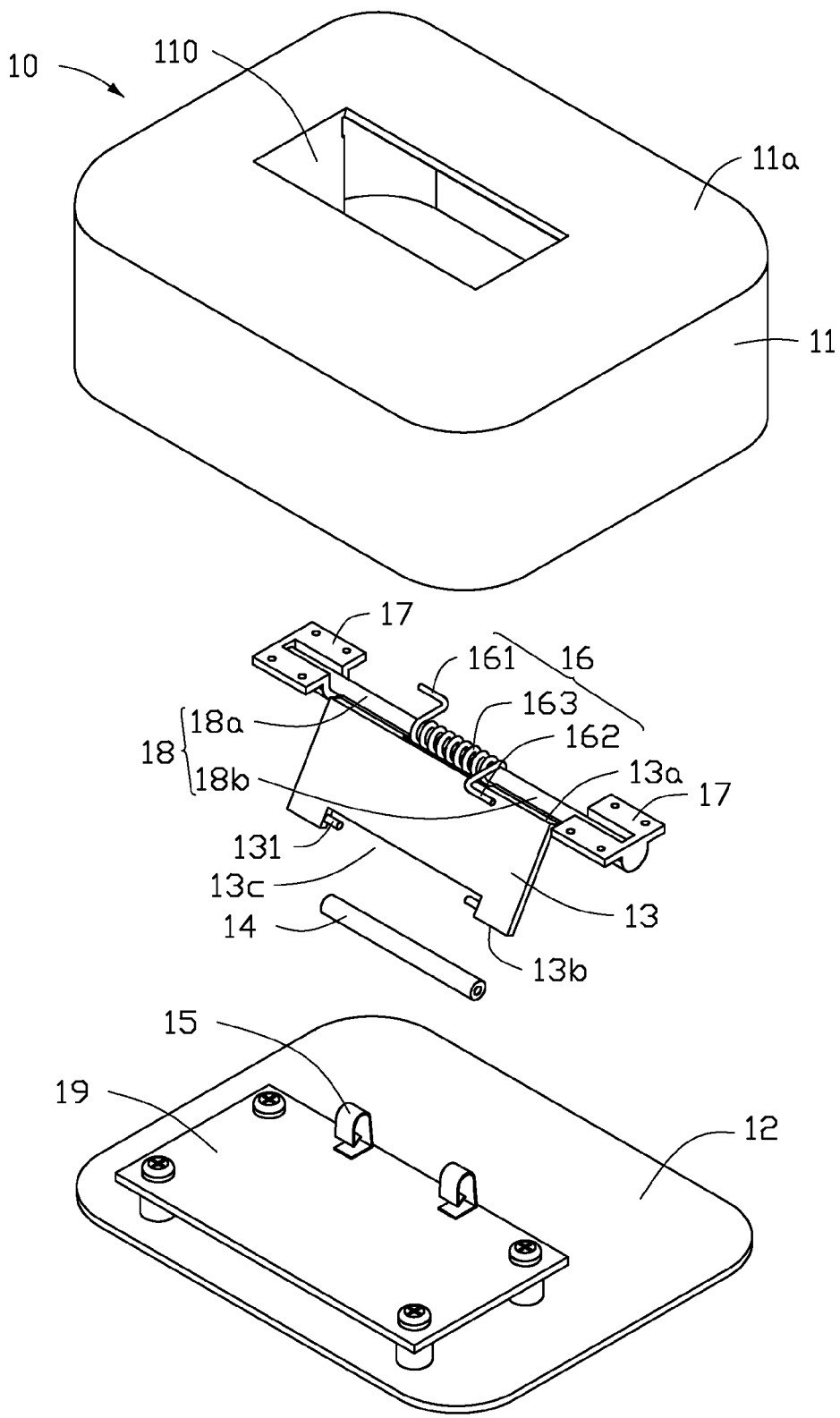
FIG. 2 is an exploded view of the charging seat of FIG. 1.
Figure 3:
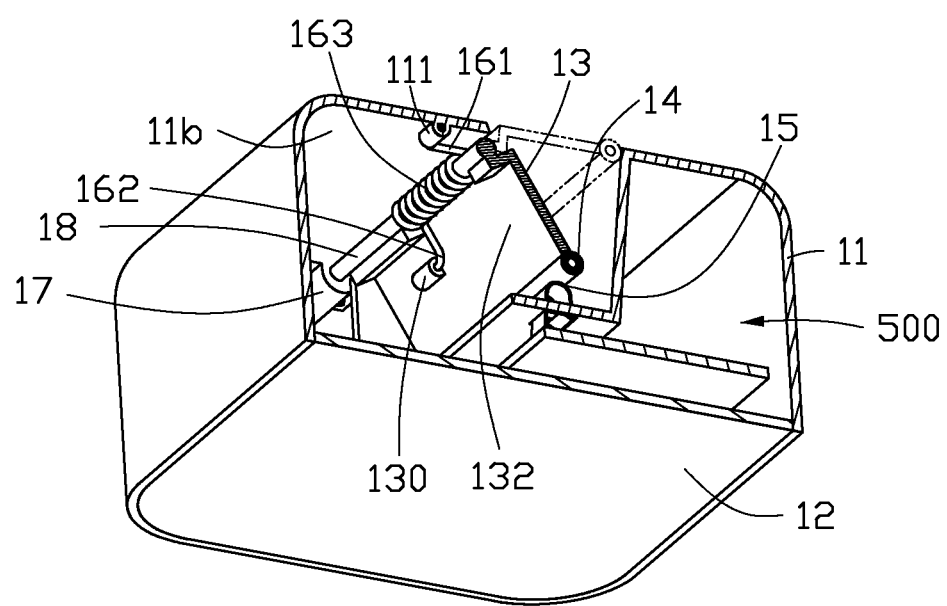
FIG. 3 is a cutaway view of the charging seat of FIG. 1.

Referring to FIGS. 1 to 3, a charging seat 10, according to a first embodiment, is shown. The charging seat 10 may be used for charging an electronic device 100 which is a cell phone in the illustrated embodiment. The charging seat 10 includes a base 12, a cover 11, a lid 13, a cleaning member 14, two conductive contacts 15, a torsion spring 16, two fasteners 17, a rotating shaft 18 and a circuit board 19.

The cover 11 is attached to the base 12 to cooperatively form a substantially cuboid receiving space 500. An opening 110 is defined in a top sheet 11a of the cover 11. A size of the lid 13 is slightly smaller than that of the opening 110 so that the lid 13 is capable of tightly closing the opening 110 when no electronic device is plugged into the opening 110. The cover 11 includes a first securing member 111 at an inner surface 11b of the top sheet 11a adjacent to the opening 110.

The lid 13 includes a second securing member 130 at an inner surface 132 of the lid 13. The two fasteners 17 are secured on the inner surface 11b of the top sheet 11a. The first securing member 111 is positioned between the two fasteners 17. The rotating shaft 18 is securely connected to the lid 13 at a first side 13a of the lid 13, which means the rotating shaft 18 is stationary with respect to the lid 13. The rotating shaft 18 rotatably extends through the torsion spring 16. In this embodiment, the rotating shaft 18 and the lid 13 are formed into a unitary piece. The rotating shaft 18 includes a first shaft 18a and a second shaft 18b. The first shaft 18a is spaced from the second shaft 18b. The torsion spring 16 includes a first distal end 161, a second distal end 162 and a torsion bar 163 between the first distal end 161 and the second distal end 162. One distal end of the first shaft 18a is rotatably received in one of the fasteners 17, and another distal end of the first shaft 18a is rotatably received in the torsion bar 163. One distal end of the second shaft 18b is rotatably received in another one of the fasteners 17 and another distal end of the second shaft 18b is rotatably received in the torsion bar 163. Therefore, the rotating shaft 18 and the lid 13 is rotatably mounted on the cover 11 and the torsion spring 16.

The first distal end 161 of the torsion spring 16 is engaged in the first securing member 111 and the second distal end 162 of the torsion spring 16 is engaged in the second securing member 130. Thus, when the lid 13 is pushed by the electronic device 100 that is plugged into the charging seat 10 to rotate against the second distal end 162 of the torsion spring 16 about the rotating shaft 18, a torque is applied to the lid 13 against the rotation of the lid 13.

A cutout 13c is formed at a second side 13b of the lid 13 opposing the first side 13a. Two posts 131 are formed in the cutout 13c opposing each other. The cleaning member 14 is rotatably supported on the posts 131 and is received in the cutout 13c. The cleaning member 14 may be a paper roller, a cloth roller, or a rubber roller. which can brush the conductive contacts 15.

The circuit board 19 is positioned on the base 12 in the receiving space 500. The two conductive contacts 15 are positioned on the circuit board 19 in the receiving space 500 and are electrically connected to the circuit board 19. The two conductive contacts 15 are positioned on an edge of a rotation route of the lid 13 about the rotating shaft 18. Therefore, when the lid 13 is pushed and the conductive contacts 15 are exposed through the opening 110, the cleaning member 14 is configured to brush the conductive contacts 15 so that the conductive contacts 15 can stay clean even after a longtime of use (see FIG. 3).

When there is no electronic device 100 plugged into the charging seat 10, the lid 13 closes the opening 110 and covers the conductive contacts 15 to prevent contamination from falling on the conductive contacts 15 (see the dashed lines in FIG. 3). When the electronic device 100 is plugged into the charging seat 10, the lid 13 is pushed by the electronic device 100 to rotate about the rotating shaft 18 and expose the conductive contacts 15. During rotation of the lid 13, the cleaning member 14 brushes the conductive contacts 15. After the electronic device 100 is pulled out of the charging seat 10, the lid 13 closes the opening 110 again under the torque applied by the torsion spring 16 to the lid 13.

Figure 4:
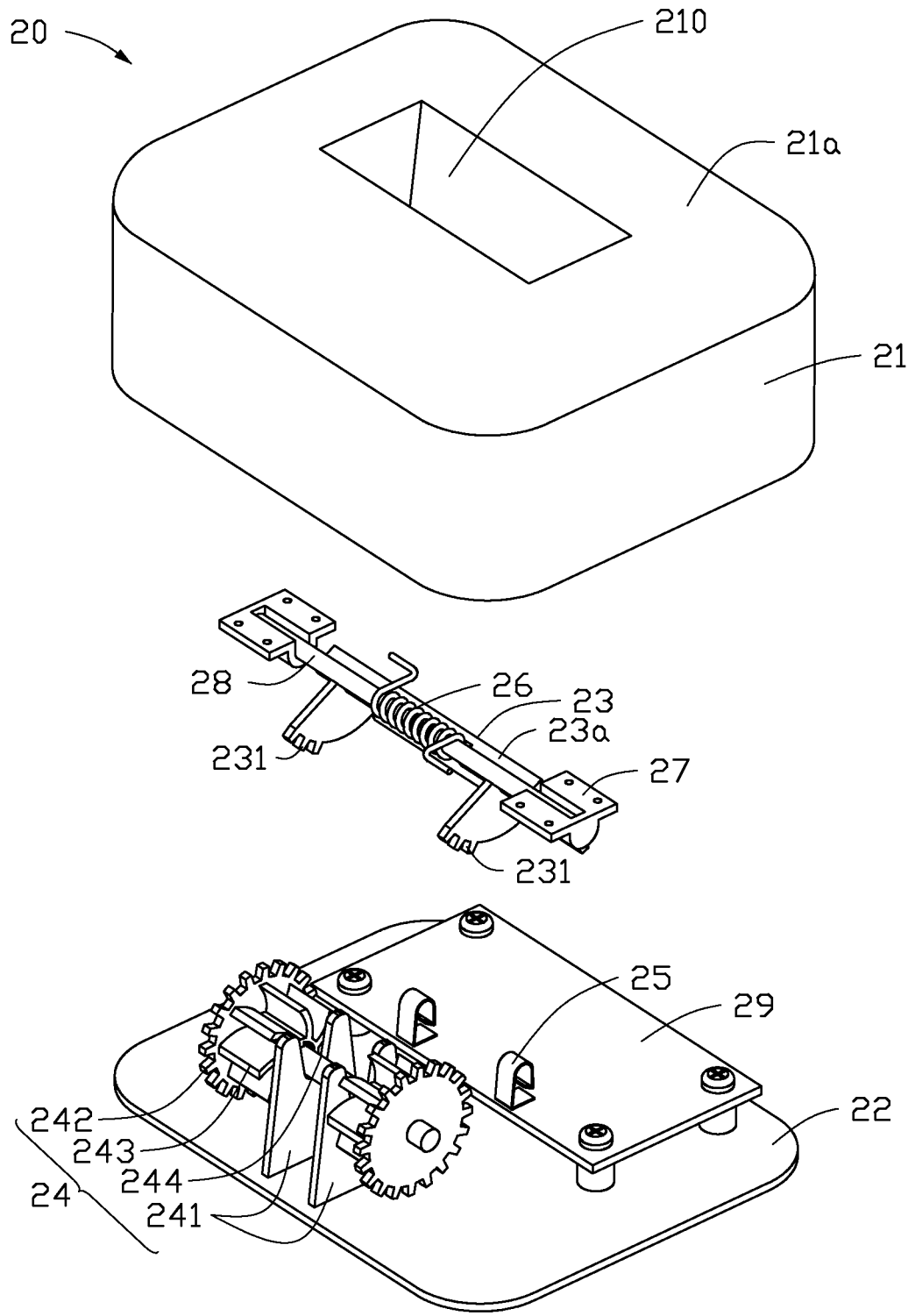
FIG. 4 is an exploded view of a charging seat, according to a second embodiment.

Referring to FIG. 4, a charging seat 20, according to a second embodiment, is shown. The charging seat 20 includes a base 22, a cover 21, a lid 23, a cleaning member 24, two conductive contacts 25, a torsion spring 26, two fasteners 27, a rotating shaft 28 and a circuit board 29.

The cover 21 is attached to the base 22 to cooperatively form a substantially cuboid receiving space (not labeled). An opening 210 is defined in a top sheet 21a of the cover 21. A size of the lid 23 is slightly smaller than that of the opening 210 so that the lid 23 is capable of tightly closing the opening 210 when no electronic device is plugged into the opening 210.

Configurations (such as arrangements and structures) of the cover 21, the conductive contacts 25, the torsion spring 26, the fasteners 27, the rotating shaft 28 and the circuit board 29 are substantially the same to those of the cover 11, the conductive contacts 15, the torsion spring 16, the fasteners 17, the rotating shaft 18 and the circuit board 19 of the first embodiment, respectively.

The charging seat 20 further includes two first gears 231. The two first gears 231 and the rotating shaft 28 are securely connected to a first side 23a of the lid 23. The first gears 231 rotate together with the rotation of the lid 23. The cleaning member 24 includes a support 241, two second gears 242, two fans 243 and a secondary rotating shaft 244. The support 241 is positioned on the base 22 adjacent to the circuit board 29 and the conductive contacts 25. The secondary rotating shaft 244 is rotatably supported on the support 241. The second gears 242 and the fans 243 are securely on the secondary rotating shaft 244. Each fan 243 is spatially corresponding to a conductive contact 25. The support 241, the fan 243, and the second gear 242 are arranged on the secondary rotating shaft 244 along a longitudinal direction of the secondary rotating shaft 244. Each second gear 242 is engaged with a corresponding first gear 231.

When the lid 23 rotates, the second gears 242 and the fans 243 are driven by the first gears 231 to rotate. Therefore, the fans 242 blow air towards the conductive contacts 25 and contaminations such as dust and water vapor, can be blown away so that the conductive contacts 25 can keep clean even after a longtime of use.

Figure 5:
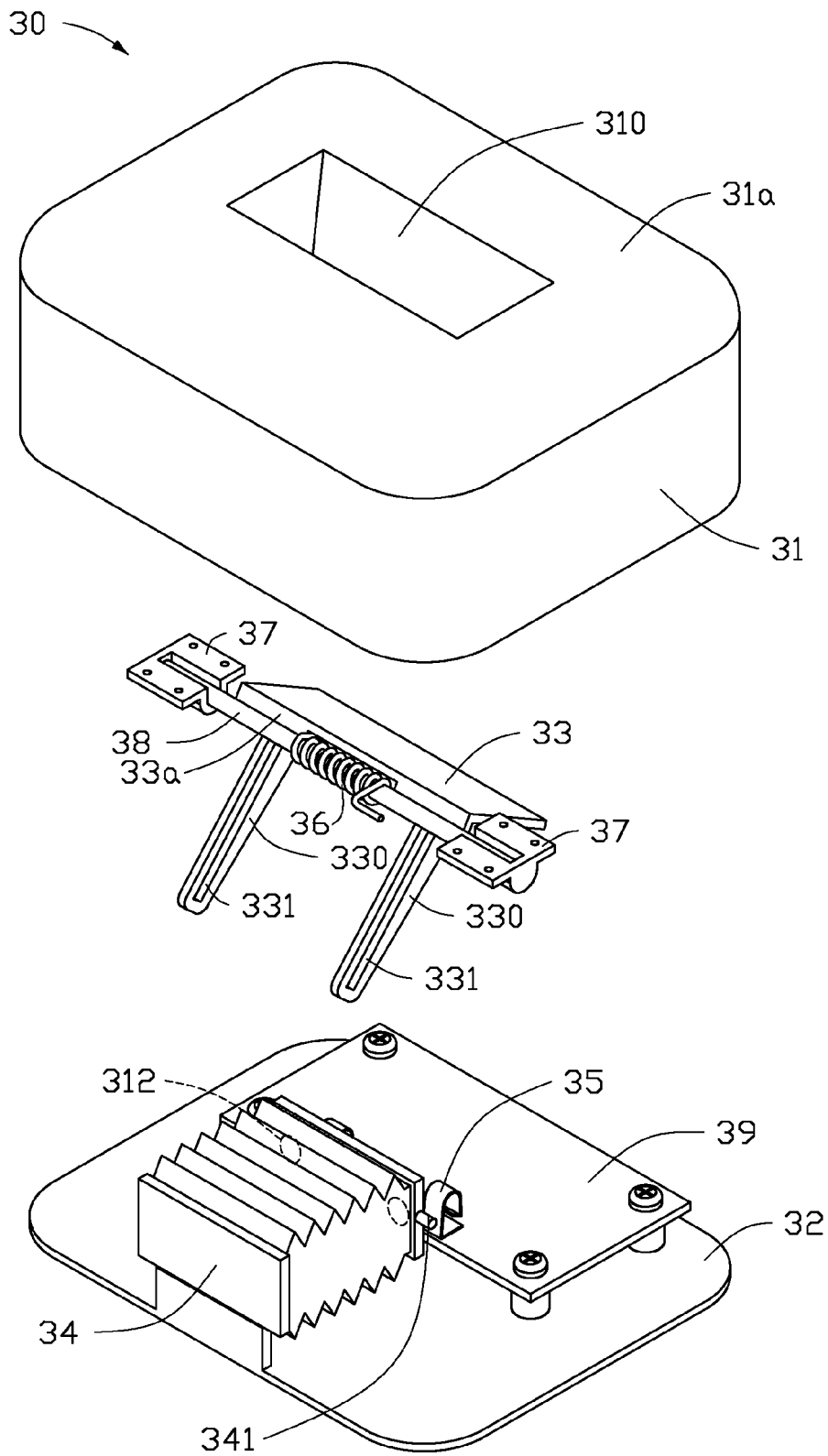
FIG. 5 is an exploded view of a charging seat, according to a third embodiment.

Referring to FIG. 5, a charging seat 30, according to a third embodiment, is shown. The charging seat 30 includes a base 32, a cover 31, a lid 33, a cleaning member 34, two conductive contacts 35, a torsion spring 36, two fasteners 37, a rotating shaft 38 and a circuit board 39.

The cover 31 is attached to the base 32 to cooperatively form a substantially cuboid receiving space (not labeled). An opening 310 is defined in a top sheet 31a of the cover 31. A size of the lid 33 is slightly smaller than that of the opening 310 so that the lid 33 is capable of tightly closing the opening 310 when no electronic device is plugged into the opening 310.

Configurations (such as arrangements and structures) of the cover 31, the conductive contacts 35, the torsion spring 36, the fasteners 37, the rotating shaft 38 and the circuit board 39 are substantially the same to those of the cover 11, the conductive contacts 15, the torsion spring 16, the fasteners 17, the rotating shaft 18 and the circuit board 19 of the first embodiment, respectively.

The charging seat 30 further two driving arms 330. The two driving arms 330 and the rotating shaft 38 are securely connected to a first side 33a of the lid 33. The driving arms 330 rotate together with the rotation of the lid 33. An elongated guiding through hole 331 is defined in the driving arm 330 along a longitudinal direction of the driving arm 330.

The cleaning member 34 includes a blower. The blower includes two followers 341 and two air vents 312. The two followers 341 extend from two lateral sides of the cleaning member 34. The two followers 341 are slidably received in the guiding through holes 331, respectively. The two air vents 312 are defined at the front of the cleaning member 34 and face the two conductive contacts 35 respectively.

When the lid 23 rotates to open the opening 310, the driving arms 330 drive the followers 341 to move along the guiding through hole 331. Therefore, the front of the blower 34 moves back to blow air towards the conductive contacts 35 via the air vents 312, and contamination such as dust and water vapor, can be blown away so that the conductive contacts 35 can stay clean even after a longtime of use.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A charging seat, comprising:
   a base comprising a first securing member;
   a cover defining an opening and covering the base;
   a plurality of conductive contacts positioned on the base;
   a lid pivotably connected to the cover and comprising a second securing member, the lid being configured to rotate between a first position where the lid closes the opening and covers the conductive contacts, and a second position where the conductive contacts are exposed through the opening;
   a torsion spring connected between the base and the lid, the torsion spring configured to apply a torque to the lid to rotate from the second position to the first position, the torsion spring comprising a first distal end engaged in the first securing member, a second distal end engaged in the second securing member and a torsion bar between the first distal end and the second distal end;
   a rotating shaft securely connected to a first side of the lid and rotatably extending through the torsion bar;
   a first gear securely connected to the first side of the lid; and
   a cleaning member connected to the lid and configured to clean the conductive contacts during the rotation of the lid from the first position to the second position, the cleaning member comprising a support, a second gear, a plurality of fans and a secondary rotating shaft, the support being positioned on the base, the secondary rotating shaft being rotatably supported on the support, the second gear and the fan being securely on the secondary rotating shaft, each of fans being spatially corresponding to a conductive contact, the second gear being engaged with the first gear.

2. The charging seat of claim 1, wherein the cleaning member is roller connected to a second side of the lid opposing the first side.

3. The charging seat of claim 1, further comprising a driving arm securely connected to the first side of the lid and defining an elongated guiding through hole along a longitudinal direction of the driving arm.

4. The charging seat of claim 3, wherein the cleaning member includes a blower comprising a follower and a plurality of air vents, the follower extending from a lateral side of the cleaning member and being slidably received in the guiding through hole, the plurality of air vents being defined at the front of the cleaning member and facing the conductive contacts respectively.

* * * * *